United States Patent
Zhang et al.

(10) Patent No.: US 10,740,873 B2
(45) Date of Patent: Aug. 11, 2020

(54) EXTRACTION METHOD FOR TIME-SPACE-SPECTRUM FOUR-DIMENSIONAL REMOTE SENSING DATA

(71) Applicant: Institute of Remote Sensing and Digital Earth, Chinese Academy of Sciences, Beijing (CN)

(72) Inventors: Lifu Zhang, Beijing (CN); Xuejian Sun, Beijing (CN); Xia Zhang, Beijing (CN)

(73) Assignee: INSTITUTE OF REMOTE SESING AND DIGITAL EARTH, CHINESE ACADEMY OF SCIENCES (CN)

(*) Notice: Subject to any disclaimer, the term of this patent is extended or adjusted under 35 U.S.C. 154(b) by 92 days.

(21) Appl. No.: 16/090,361

(22) PCT Filed: Apr. 1, 2016

(86) PCT No.: PCT/CN2016/078248
§ 371 (c)(1),
(2) Date: Oct. 1, 2018

(87) PCT Pub. No.: WO2017/166261
PCT Pub. Date: Oct. 5, 2017

(65) Prior Publication Data
US 2019/0114745 A1  Apr. 18, 2019

(51) Int. Cl.
*G06T 3/40* (2006.01)
*G06F 16/909* (2019.01)
(Continued)

(52) U.S. Cl.
CPC ......... *G06T 3/4061* (2013.01); *G06F 16/587* (2019.01); *G06F 16/909* (2019.01); *G06T 3/4069* (2013.01); *G06F 16/5838* (2019.01)

(58) Field of Classification Search
CPC ............... G06K 9/0063; G06K 9/46; G06K 2009/00644; G06K 2009/4657;
(Continued)

(56) References Cited

U.S. PATENT DOCUMENTS

2015/0112135 A1* 4/2015 Hirota ............... A61B 1/04
                                                            600/109

FOREIGN PATENT DOCUMENTS

CN   103020325 A  *  4/2013  ............ G06F 17/30
CN   103020325 A       4/2013
(Continued)

OTHER PUBLICATIONS

International Search Report; dated Dec. 28, 2016 for PCT Application No. PCT/CN2016/078248.

*Primary Examiner* — Golam Sorowar
(74) *Attorney, Agent, or Firm* — Mendelsohn Dunleavy, P.C.

(57) ABSTRACT

Disclosed is an extraction method for time-space-spectrum four-dimensional remote sensing data. The method includes: obtaining remote sensing images at a preset coverage area during a preset time period (S1); re-projecting the remote sensing images in a way that the respective pixel positions of the respective remote sensing images at different time points are overlapped (S2); storing all of re-projected remote sensing images into a storage unit according to a first preset storage method, or storing all of the re-projected remote sensing images into the storage unit according to a second preset storage method (S3); determining, on the basis of requirement information for data extraction, whether current data format of remote sensing data is a data format matching the requirement information (S4); if yes, determining, on the basis of the requirement information, a storage location of required remote sensing data, and extracting the required remote sensing data (S5). In the case storing is executed (Continued)

through the two preset storage methods above, the time consumption for locating the storage location can be reduced, thus the efficiency in processing the four-dimensional remote sensing data can be improved.

11 Claims, 4 Drawing Sheets

(51) Int. Cl.
*G06F 16/587* (2019.01)
*G06F 16/583* (2019.01)

(58) Field of Classification Search
CPC ....... G06K 2009/4666; G06K 9/00476; G06K 9/4604; G06K 9/4642; G06K 9/4647; G06K 9/6215; G06K 9/6253; G06K 9/6269; G06T 2207/10016; G06T 2207/10024; G06T 2207/10036; G06T 2207/10068; G06T 2207/20182; G06T 2207/30181; G06T 5/40; G06T 7/30; G06T 7/50; G06T 7/90; G06T 9/00
See application file for complete search history.

(56) References Cited

FOREIGN PATENT DOCUMENTS

| CN | 103137146 A | 6/2013 |
| CN | 103247059 A | 8/2013 |
| WO | WO2008122830 A1 | 10/2008 |

\* cited by examiner

EXTRACTION METHOD FOR TIME-SPACE-SPECTRUM FOUR-DIMENSIONAL REMOTE SENSING DATA

FIELD OF TECHNOLOGY

The present disclosure relates to the technical filed of remote sensing, and particularly to an extraction method for time-space-spectrum four-dimensional remote sensing data.

BACKGROUND

With the rapid development of remote sensing technology, remote sensing data is constantly developing towards high time, high space and high spectral resolution. For the obtaining of traditional remote sensing data, it is difficult to obtain images with high time and high spectral resolution simultaneously due to the limitation of the remote sensing technology. Nowadays, it is possible to obtain the data with high time, high space and high spectral resolution simultaneously through data processing, so as to meet the urgent need for high time, high space, and high spectral resolution remote sensing data of the remote sensing applications. Research and analysis based on time dimension and spectral dimension have become the hot spot in remote sensing study.

In traditional remote sensing study, it is developed from three dimensions whether it is based on space-spectrum or space-time. The remote sensing data used in this way contains three dimensions, two of which are space and the other is time or spectrum, therefore the requirement can be met by using a storage method based on a three-dimensional storage structure. However, for the four-dimensional remote sensing data based on the time-space-spectral and processed by data processing, if still stored as the three-dimensional remote sensing data, it is necessary to become a three-dimensional cube set in one time sequence or one spectral sequence by reducing the dimension of the spectral dimension or time dimension. Such storage method does not have multidimensional analysis of time, space and spectrum, and is inconvenient to efficiently manage, organize, extract and operate the four-dimensional remote sensing data.

SUMMARY

In view of the defects above, the present disclosure provides an extraction method for time-space-spectrum four-dimensional remote sensing data, which can improve the processing efficiency of the four-dimensional remote sensing data.

The extraction method for time-space-spectrum four-dimensional remote sensing data provided by the present disclosure includes:

obtaining remote sensing images at a preset coverage area during a preset time period;

re-projecting the remote sensing images in a way that the respective pixel positions of the respective remote sensing images at different time points are overlapped; wherein the re-projected remote sensing images are a number of spectral cubes in time sequence, and each spectral cube is space-spectrum data of corresponding time point;

storing the re-projected remote sensing images into a storage unit according to a first preset storage method, so as to obtain remote sensing data in a first data format; or storing the re-projected remote sensing images in the storage unit according to a second preset storage method, so as to obtain the remote sensing data in a second data format;

determining, on the basis of requirement information for data extraction, whether current data format of the remote sensing data is a data format matching with the requirement information, if the current data format of the remote sensing data is a data format matching with the requirement information, determining, on the basis of the requirement information, a storage location of required remote sensing data, and extracting the required remote sensing data;

wherein, the first preset storage method includes:

storing each spectral cube into the storage unit in time order, wherein when each spectral cube is stored, the space-spectrum data in the spectral cube is stored according to spatial location in an order that row is first and then column, and the space-spectrum data in a same spatial location is stored according to spectral band in an order from high to low or from low to high;

wherein, the second preset storage method includes:

storing each spectral cube into the storage unit in time order, wherein when each spectral cube is stored, the space-spectrum data in the spectral cube is stored according to the spectral band in an order from high to low or from low to high, and the space-spectrum data of a same spectral band is stored according to the spatial location in an order that row is first and then column.

Alternatively, the requirement information is the extraction of the spectral cube of a preset time point, the data format matching with the requirement information is the first data format; or the requirement information is the extraction of the spectral data at a present spatial location and at the preset time point, the data format matching with the requirement information is the second data format.

Alternatively, the requirement information is the extraction of the spectral cube of the preset time point, the extraction method further includes:

selecting data of three spectral bands from the spectral cube at the preset time point, and synthesizing and displaying the data of the selected three spectral bands as three channels of RGB; or selecting data of one spectral band from the spectral cube at the preset time point, and displaying the data of the selected spectral band in gray scale.

Alternatively, the requirement information is the exportation of a feature cube, the data format matching with the requirement information is the first data format; the feature cube includes data of at least three preset spectral bands selected from the spectral cube of the preset time point, or data of at least three preset time points selected from the time cube of preset spectral band.

Alternatively, the extraction method further includes:

selecting data of three spectral bands from the feature cube that includes data of at least three preset spectral bands or selecting data of three time points from the feature cube that includes data of at least three preset time points, as three channels of RGB to be synthesized and displayed; or selecting data of one spectral band from the feature cube that includes data of at least three preset spectral bands or selecting data of one time point from the feature cube that includes data of at least three preset time points, to be displayed in a gray scale map.

Alternatively, the extraction method further includes:

storing the remote sensing data with a storing method corresponding to the data format matching with the requirement information, so as to obtain the remote sensing data of the data format matching with the requirement information, and extracting the required remote sensing data, when it is determined that the current data format of the remote sensing data is different from the data format matching with the requirement information.

Alternatively, the requirement information is the extraction of time cube of a preset spectral band, the data format matching with the requirement information is a third data format, the storage method corresponding to the third data format includes:

dividing the four-dimensional remote sensing data into a plurality of time cubes according to the spectral band, and each time cube is space-time data corresponding to the spectral band;

storing each time cube into the storage unit according to the spectral band in an order from high to low or from low to high, wherein when each time cube is stored, the space-time data in the time cube is stored according to spatial location in an order that row is first and then column, and the space-time data at a same spatial location is stored according to time order.

Alternatively, the extraction method further includes:

selecting data of three time points from the time cube of the preset spectral band, and synthesizing and displaying the data of the selected three time points as three channels of RGB; or selecting data of one time point in the time cube of the preset spectral band, and displaying the data of the selected one time point in gray scale.

Alternatively, the requirement information is the extraction of time spectrum data of a preset spectral band at a preset spatial location, the data format matching with the requirement information is a fourth data format, the storage method corresponding to the fourth data format includes:

dividing the four-dimensional remote sensing data into a plurality of time cubes according to the spectral band, and each time cube is space-time data corresponding to the spectral band;

storing each time cube into the storage unit according to the spectral band in an order from high to low or from low to high, wherein when each time cube is stored, the space-time data in the time cube is stored in time order, and the space-time data at a same time point is stored according to spatial location in an order that row is first and then column.

Alternatively, the requirement information is the extraction of time-spectrum data at a preset spatial location, the data format matching with the requirement information is a fifth data format, the storage method corresponding to the fifth data format includes:

storing the four-dimensional remote sensing data into the storage unit according to the spectral band in an order from high to low or from low to high, and the four-dimensional remote sensing data of a same spectral band is stored in time order, and the remote sensing data at a same time point is stored according to spatial location in an order that row is first and then column.

According to the technical solutions above, the present disclosure uses the first preset storage method or the second preset storage method for storage. The first preset storage method stores data of different spectral bands at the same time together to ensure the storage space continuity of the data of the entire spectral band, therefore the computer can extract the data of one spectral band at the fastest speed during extraction, which reduces the time consumption when locating the storage location; the first preset storage method is more suitable for the spatial operation of the images. While the second preset storage method preferentially organizes the spectral data of each pixel together to ensure the continuity of each spectrum in the storage space, therefore the computer can extract the spectral data of one pixel at the fastest speed, which reduces the time consumption for locating the storage location; the second preset storage method is suitable for the spectral operation of the images. It can be understood that in the case storing is made through any one of the two preset storage methods above and when the extraction requirements match the current data format, the time consumption for locating the storage location can be reduced, thus the efficiency in extracting the four-dimensional remote sensing data can be improved.

DETAILED DESCRIPTION

The specific implementation manners of the present disclosure will be further described in detail with reference to the accompanying drawings and embodiments. The following embodiments are used to illustrate the present disclosure, but are not intended to limit the scope thereof.

Figure 1:
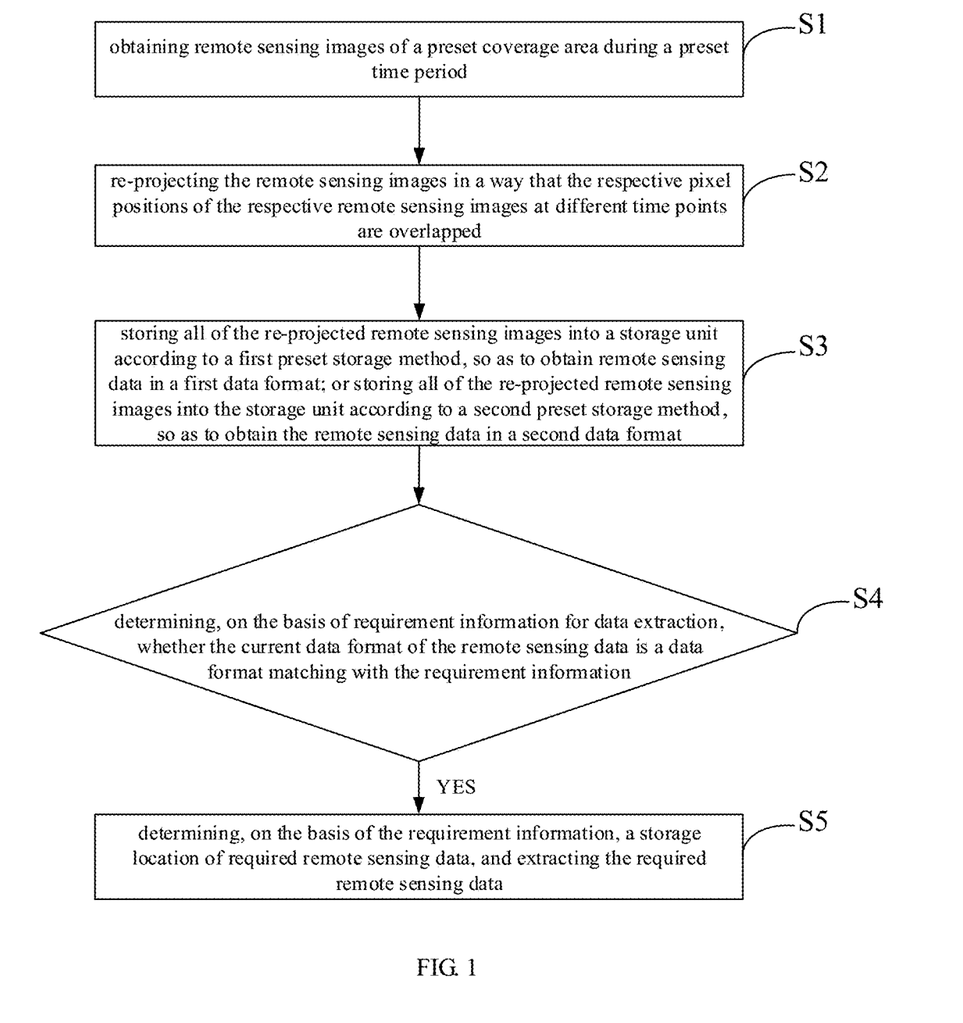
FIG. 1 is a flow chart of an embodiment of the extraction method for time-space-spectrum four-dimensional remote sensing data of the present disclosure.
Figure 2:
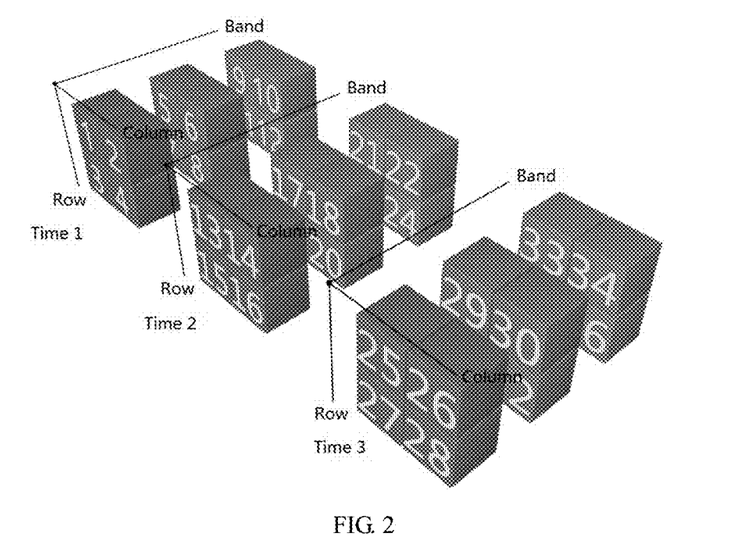
FIG. 2 is a storage structure diagram of the remote sensing data stored in a first data format.
Figure 3:
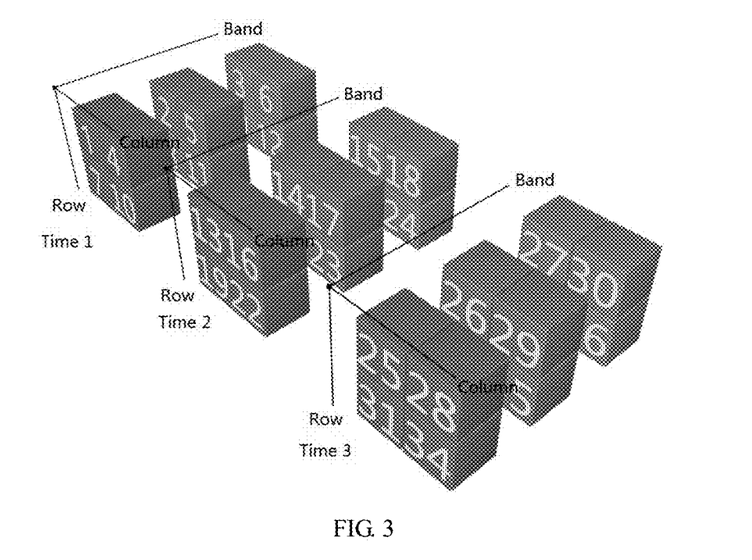
FIG. 3 is a storage structure diagram of the remote sensing data stored in a second data format.

The present disclosure provides an extraction method for time-space-spectrum four-dimensional remote sensing data. As shown in FIGS. 1-3, the method includes:

S1. obtaining remote sensing images of a preset coverage area during a preset time period;

S2. re-projecting the remote sensing images in a way that the respective pixel positions of the respective remote sensing images at different time points are overlapped; the re-projected remote sensing images are a number of spectral cubes in time sequence, and each spectral cube is space-spectrum data of corresponding time point;

S3. storing all of the re-projected remote sensing images into a storage unit according to a first preset storage method, so as to obtain a remote sensing data in a first data format; or storing all of the re-projected remote sensing images into the storage unit according to a second preset storage method, so as to obtain the remote sensing data in a second data format;

S4. determining, on the basis of requirement information for data extraction, whether the current data format of the remote sensing data is a data format matching with the requirement information, S5. if the current data format of the remote sensing data is a data format matching with the requirement information, determining, on the basis of the requirement information, a storage location of required remote sensing data, and extracting the required remote sensing data;

wherein, the first preset storage method includes:

storing each spectral cube into the storage unit in time order, wherein when each spectral cube is stored, the space-spectrum data in the spectral cube is stored according to spatial location in an order that row is first and then column, and the space-spectrum data at a same spatial location is stored according to spectral band in an order from high to low or from low to high;

wherein, the second preset storage method includes:

storing each spectral cube into the storage unit in time order, wherein when each spectral cube is stored, the space-spectrum data in the spectral cube is stored according to the spectral band in an order from high to low or from low to high, and the space-spectrum data of a same spectral band is stored according to the spatial location in an order that row is first and then column.

FIG. 2 is a storage structure corresponding to the first data format, FIG. 3 is a storage structure corresponding to the second data format. It can be seen from FIGS. 2 and 3 that the spectral cube is a sum of the data of the respective spectral bands at the respective spatial locations at the same time point.

It can be understood that the reason why the remote sensing data is stored in the first data format or the second data format in the present disclosure is that the re-projected image data is a number of spectral cubes of time sequence, and it is convenient and fast to store the remote sensing data in the two data formats. Moreover, the two data formats facilitate subsequent data format conversion that may occur. Therefore, it is also convenient and easy to convert the first data format and the second data format into other data formats.

In the extraction method provided by the present disclosure, the first preset storage method or the second preset storage method is used for storage. The first preset storage method stores data of different spectral bands at the same time to ensure the storage space continuity of the data of the entire spectral band, therefore the computer can extract the data of one spectral band at the fastest speed during extraction, which reduces the time consumption when locating the storage location. The first preset storage method is suitable for the spatial operation of the images. The typical application scenarios are the spectral band operation, the spatial domain filter, etc. While the second preset storage method preferentially organizes the spectral data of each pixel together to ensure the continuity of each spectrum in the storage space, therefore the computer can extract the spectral data of one pixel at the fastest speed, which reduces the time consumption for locating the storage location. The second preset storage method is suitable for the spectral operation of the images. A typical application scenario is extracting the spectral data of one or more pixels. It can be understood that in the case storing is made through the two preset storage methods above and when the extraction requirements match the current data format, the time consumption for locating the storage location can be reduced, thus the efficiency in extracting the four-dimensional remote sensing data can be improved.

In a specific implementation, if the requirement information is the extraction of the spectral cube of a preset time point, the data format that matches the requirement information is the first data format. If the requirement information is the extraction of the spectral data at a preset spatial location and at a preset time point, the data format matching with the requirement information is the second data format.

It can be understood that the matched data formats are different when the requirements of data extraction are different. The term of "matched" here refers to the optimal data format, under which the extraction efficiency is the highest. In the present disclosure, whether the current data format is the optimal data format is determined before extraction, that is, the extraction is performed after it is ensured that the extraction requirements match with the current data format, thereby improving the extraction efficiency.

In a specific implementation, if the requirement information is the extraction of the spectral cube of a preset time point, the extraction method may further include:

selecting data of three spectral bands from the spectral cube at the preset time point, and synthesizing and displaying the data of the selected three spectral bands as three channels of RGB; or selecting data of one spectral band from the spectral cube at the preset time point, and displaying the data of the selected spectral band in gray scale.

The advantage is that the visibility of the data can be improved by displaying certain data while extracting.

In a specific implementation, if the requirement information is the exportation of a feature cube, the data format matching with the requirement information is the first data format; the feature cube includes data of at least three preset spectral bands selected from the spectral cube at the preset time point, or data of at least three preset time points selected from the time cube of preset spectral band.

In this case, the extraction method provided by the present disclosure may further include:

selecting data of three spectral bands from the feature cube that includes data of at least three preset spectral bands or selecting data of three time points from the feature cube that includes data of at least three preset time points, as three channels of RGB to be synthesized and displayed;

or, selecting data of one spectral band from the feature cube that includes data of at least three preset spectral bands or selecting data of one time point from the feature cube that includes data of at least three preset time points, to be displayed in a gray scale map.

The advantage is that the visibility of the data can be improved by displaying certain data while extracting.

Of course, if the current data format is not optimal, that is, the current data format of the remote sensing data is different from the data format matching with the requirement information, the data format needs to be converted. The so-called conversion is storing the remote sensing data with a storage method corresponding to the data format matching with the requirement information, so as to obtain the remote sensing data of the data format matching with the requirement information. The required remote sensing data is extracted after the conversion is completed, thus the efficiency of the extraction is maintained.

Wherein, if the requirement information is the extraction of a time tube of a preset spectral band, the data format matching with the requirement information is not the first data format, nor the second data format, but another data format named a third data format. The storage method corresponding to the third data format includes:

dividing the four-dimensional remote sensing data into a plurality of time cubes according to the spectral band, and each time cube is space-time data corresponding to the spectral band;

storing each time cube into the storage unit according to the spectral band in an order from high to low or from low to high, wherein when each time cube is stored, the space-time data in the time cube is stored according to spatial location in an order that row is first and then column, and the space-time data at a same spatial location are stored in time order.

Figure 4:
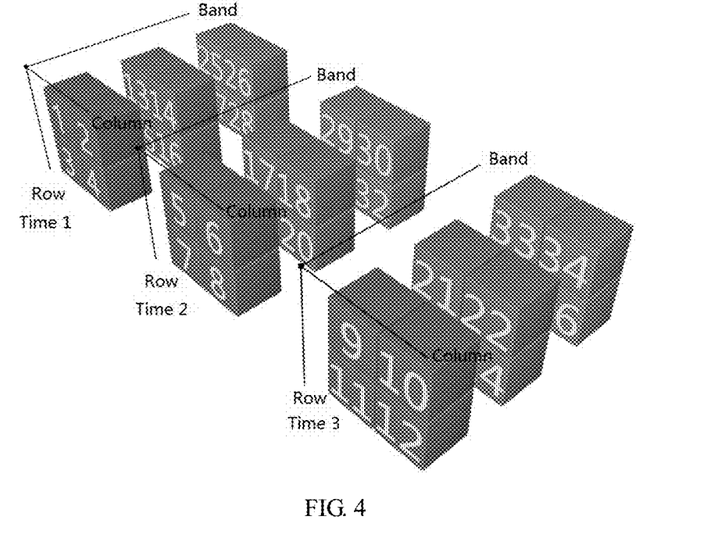
FIG. 4 is a storage structure diagram of the remote sensing data stored in a third data format.

FIG. 4 is a storage structure corresponding to the third data format. The time cube in FIG. 4 is the sum of the data of one spectral band at the respective spatial positions and at the respective time points.

This storage method guarantees the spatial continuity, and on this basis, it highlights the time continuity of the spectral band, therefore the computer can extract the time cube of one spectral band at the fastest speed, which reduces the time consumption for locating the storage location, thus the conversion efficiency is improved. A typical application scenario is extracting the time cube of one spectral band in a regular planar space region.

Of course, when the time cube is extracted, the extraction method provided by the present disclosure may further include:

selecting data of three time points from the time cube of the preset spectral band, and synthesizing and displaying the data of the selected three time points as three channels of RGB; or selecting data of one time point from the time cube of the preset spectral band, and displaying the data of the selected one time point in gray scale.

The advantage is that the visibility of the data can be improved by displaying certain data while exporting.

Wherein, if the requirement information is the extraction of time spectrum data of a preset spectral band at a preset spatial location, the data format matching with the requirement information is also different from the three data formats above, it is a fourth data format. The storage method corresponding to the fourth data format includes:

dividing the four-dimensional remote sensing data into a plurality of time cubes according to the spectral band, and each time cube is space-time data corresponding to the spectral band;

storing each time cube into the storage unit according to the spectral band in an order from high to low or from low to high, wherein when each time cube is stored, the space-time data in the time cube is stored in time order, and the space-time data at a same time point is stored according to spatial location in an order that row is first and then column.

Figure 5:
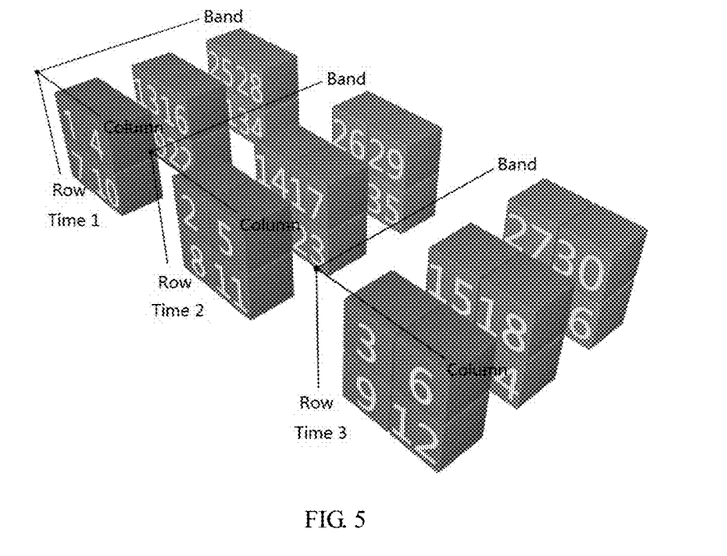
FIG. 5 is a storage structure diagram of the remote sensing data stored in a fourth data format.

FIG. 5 is a storage structure corresponding to the fourth data format. It can be understood from FIG. 5 that this storage method preferentially organizes the time spectral data of each pixel together to ensure the continuity of each time spectrum in the storage space, therefore the computer can extract the time spectral data of one pixel at the fastest speed, which reduces the time consumption for locating the storage location, thus the conversion efficiency is improved. A typical application scenario is extracting the time spectral data of one or more pixels in a certain spectral band.

Wherein, if the requirement information is the extraction of time-spectrum data at a preset spatial location, the data format matching with the requirement information is a fifth data format. The storage method corresponding to the fifth data format includes:

storing the four-dimensional remote sensing data into the storage unit according to the spectral band in an order from high to low or from low to high, and the four-dimensional remote sensing data of a same spectral band is stored in time order, and the remote sensing data at a same time point is stored according to spatial location in an order that row is first and then column.

Figure 6:
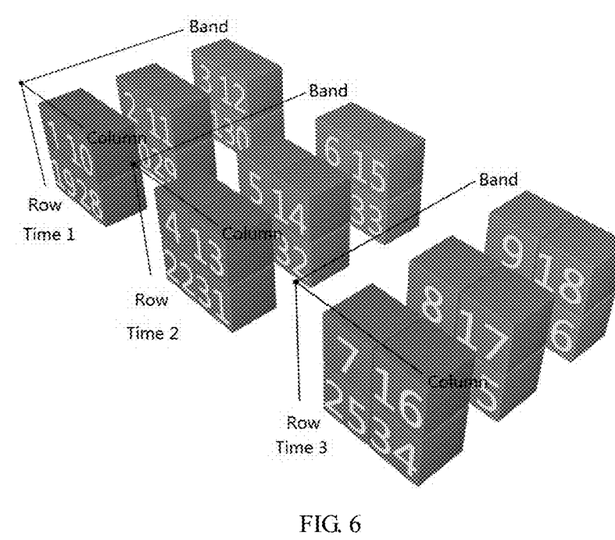
FIG. 6 is a storage structure diagram of the remote sensing data stored in a fifth data format.

FIG. 6 is a storage structure corresponding to the fifth data format. It can be understood from FIG. 6 that this storage method preferentially organizes the spectral data of each pixel together, therefore the computer can extract the spectral data of one pixel and the time sequence data of the spectrum at the fastest speed, which reduces the time consumption for locating the storage location, thus the conversion efficiency is improved. A typical application scenario is the extraction of the time-spectrum data and observing the change of one spectrum over time.

It can be understood that there are five storage methods in the present disclosure for storing the four-dimensional data, which can generate five data formats, and each of the data formats can be suitable for different scenarios. It ensures that the data format during extraction is adapted to the extraction requirements in the present disclosure, thus reducing the time consumption for locating the storage location and improving the extraction efficiency.

Although the data format of the remote sensing data is not necessarily matched with the extraction requirements after the initial storage, the remote sensing data in the optimal data format can be obtained by the format conversion. Wherein, a direct conversion or an indirect conversion which selects one or more data formats for transition can be used during conversion. In order to improve the conversion efficiency, the adjacent two data formats are as similar as possible. There are 10 kinds of direct two-two conversions among these five data formats. In order to facilitate the indirect conversion, a set of basic conversion relationships is found in practice, and this set of conversion relationships is combined in the actual conversion process later, so as to achieve the conversion between any two formats. The set of basic conversion relationships includes the following four ways:

(1) the conversion between the first data format and the second data format;

(2) the conversion between the second data format and the fifth data format;

(3) the conversion between the first data format and the third data format;

(4) the conversion between the third data format and the fourth data format;

these four basic conversion relationships are obtained through fully considering the intrinsic characteristics of the five data formats, so that the number of times for finding the target data by computer in the storage unit is reduced as little as possible, thereby reducing the time spent in the data conversion process.

Based on these four basic conversion ways, another six conversions can be achieved, which are:

(1) the conversion between the fourth data format and the first data format:

achieved by converting sequentially in the order that the fourth data format <-> the third data format <-> the first data format;

(2) the conversion between the fourth data format and the second data format:

achieved by converting sequentially in the order that the fourth data format <-> the third data format <-> the first data format <-> the second data format;

(3) the conversion between the fourth data format and the fifth data format:

achieved by converting sequentially in the order that the fourth data format <-> the third data format <-> the first data format <-> the second data format <-> the fifth data format;

(4) the conversion between the third data format and the second data format:

achieved by converting sequentially in the order that the third data format <-> the first data format <-> the second data format;

(5) the conversion between the third data format and the fifth data format:

achieved by converting sequentially in the order that the third data format <-> the first data format <-> the second data format <-> the fifth data format;

(6) the conversion between the first data format and the fifth data format:

achieved by converting sequentially in the order that the first data format <-> the second data format <-> the fifth data format.

Finally, based on the five data formats and the conversion relationships above, the extraction of spectra, time spectra, spectral cube, time cubes and/or feature cubes are achieved.

In addition, the file organization structure of the four-dimensional remote sensing data generally includes two files, one is a header file, and the other is a data file. Wherein the data file is image data, and some attribute information of the image data are recorded in the header file, such as the size of space, spectrum, time spectrum, and data storage format, and data type, etc., it also records some additional descriptive information, such as coordinate projection, affine transformation coefficients, names of spectral dimension and time dimension, file name, data offset and the like information.

The embodiments above are merely for illustrating the present disclosure and are not to be limiting the scope of the present disclosure. And various changes and modifications can be made by the person of ordinary skills in the related arts without departing from the spirit and scope of the present disclosure. Therefore all of the equivalent technical solutions are also within the scope of the present disclosure, which should be defined by the claims.

INDUSTRIAL APPLICABILITY

The extraction method for time-space-spectrum four-dimensional remote sensing data provided by the present disclosure stores the remote sensing data in the first data format or the second data format by using the first preset storage method or the second preset storage method, the reason is that the re-projected image data is a number of spectral cubes of time sequence, and it is convenient and fast to store the remote sensing data in the two data formats. Moreover, the two data formats facilitate the subsequent data format conversion that may occur. By using any one of the two preset storage methods above and when the extraction requirements match with the current data format, the time consumption for locating the storage location can be reduced, thus the efficiency in extracting the four-dimensional remote sensing data is improved, and solving the problem in the existing storage methods that the storage is must be performed by reducing dimensions of the spectral dimension or time dimension, which results in a low efficiency of extracting the subsequent data. The method has industrial applicability.

What is claimed is:

1. An extraction method for time-space-spectrum four-dimensional remote sensing data, comprises:
   obtaining remote sensing images at a preset coverage area during a preset time period;
   re-projecting the remote sensing images in a way that respective pixel positions of the respective remote sensing images at different time points are overlapped; wherein the re-projected remote sensing images are a number of spectral cubes in time sequence, and each spectral cube is space-spectrum data of corresponding time point;
   storing the re-projected remote sensing images into a storage unit according to a first preset storage method, so as to obtain a remote sensing data in a first data format; or storing the re-projected remote sensing images into the storage unit according to a second preset storage method, so as to obtain the remote sensing data in a second data format; and
   determining, on a basis of requirement information for data extraction, whether current data format of the remote sensing data is a data format matching the requirement information,
   when the current data format of the remote sensing data is the data format matching with the requirement information, determining, on the basis of the requirement information, a storage location of required remote sensing data, and extracting the required remote sensing data;
   wherein, the first preset storage method includes:
   storing each spectral cube into the storage unit in time order, wherein when each spectral cube is stored, the space-spectrum data in the spectral cube is stored according to spatial location in an order that row is first and then column, and the space-spectrum data in a same spatial location is stored according to spectral band in an order from high to low or from low to high;
   wherein, the second preset storage method includes:
   storing each spectral cube into the storage unit in time order, wherein when each spectral cube is stored, the space-spectrum data in the spectral cube is stored according to the spectral band in an order from high to low or from low to high, and the space-spectrum data of a same spectral band is stored according to the spatial location in an order that row is first and then column;
   wherein the extraction method further comprises:
   storing the remote sensing data with a storing method corresponding to the data format matching with the requirement information, so as to obtain the remote sensing data of the data format matching with the requirement information, and extracting the required remote sensing data, when it is determined that the current data format of the remote sensing data is different from the data format matching with the requirement information;
   when the requirement information is the extraction of a time cube of a present spectral band, the data format matching with the requirement information is a third data format, the storage method corresponding to the third data format comprises:
   dividing the four-dimensional remote sensing data into a plurality of time cubes according to the spectral band, and each time cube is space-time data corresponding to the spectral band; and
   storing each time cube into the storage unit according to the spectral band in an order from high to low or from low to high, wherein when each time cube is stored, the space-time data in the time cube is stored according to spatial location in an order that row is first and then column, and the space-time data at a same spatial location is stored according to time order;
   when the requirement information is the extraction of time spectrum data of a preset spectral band at a preset spatial location, the data format matching with the requirement information is a fourth data format, the storage method corresponding to the fourth data format comprises:
   dividing the four-dimensional remote sensing data into a plurality of time cubes according to the spectral band, and each time cube is space-time data corresponding to the spectral band; and
   storing each time cube into the storage unit according to the spectral band in an order from high to low or from low to high, wherein when each time cube is stored, the space-time data in the time cube is stored in time order, and the space-time data at a same time point is stored according to spatial location in an order that row is the first and then column; and when the requirement information is the extraction of time-spectrum data at a preset spectral location, the data format matching with the requirement information is a fifth data format, the storage method corresponding to the fifth data format comprises:

storing the four-dimensional remote sensing data into the storage unit according to the spectral band in an order from high to low or from low to high, and the four-dimensional remote sensing data of a same spectral band is stored in time order, and the remote sensing data at a same time point is stored according to spatial location in an order that row is first and then column.

2. The extraction method of claim 1, wherein
the requirement information is the extraction of the spectral cube of a preset time point, the data format matching with the requirement information is the first data format; or
the requirement information is the extraction of the spectral data at a present spatial location and at the preset time point, the data format matching with the requirement information is the second data format.

3. The extraction method of claim 2, wherein the requirement information is the extraction of the spectral cube of the preset time point, the extraction method further comprises:
selecting data of three spectral bands from the spectral cube at the preset time point, and synthesizing and displaying the data of the selected three spectral bands as three channels of RGB; or selecting data of one spectral band from the spectral cube at the preset time point, and displaying the data of the selected spectral band in gray scale.

4. The extraction method of claim 1, wherein the requirement information is the exportation of a feature cube, the data format matching with the requirement information is the first data format; the feature cube comprises data of at least three preset spectral bands selected from the spectral cube at the preset time point, or data of at least three preset time points selected from the time cube of preset spectral band.

5. The extraction method of claim 4, further comprises:
selecting data of three spectral bands from the feature cube that comprises data of at least three preset spectral bands or selecting data of three time points from the feature cube that comprises data of at least three preset time points, as three channels of RGB to be synthesized and displayed; or
selecting data of one spectral band from the feature cube that comprises data of at least three preset spectral bands or selecting data of one time point from the feature cube that comprises data of at least three preset time points, to be displayed in a gray scale map.

6. The extraction method of claim 1, wherein:
the requirement information is the extraction of a time cube of a preset spectral band, the data format matching with the requirement information is a third data format, the storage method corresponding to the third data format comprises:
dividing the four-dimensional remote sensing data into a plurality of time cubes according to the spectral band, and each time cube is space-time data corresponding to the spectral band; and storing each time cube into the storage unit according to the spectral band in an order from high to low or from low to high, wherein when each time cube is stored, the space-time data in the time cube is stored according to spatial location in an order that row is first and then column, and the space-time data at a same spatial location is stored according to time order.

7. The extraction method of claim 6, further comprises:
selecting data of three time points from the time cube of the preset spectral band, and synthesizing and displaying the data of the selected three time points as three channels of RGB; or selecting data of one time point in the time cube of the preset spectral band, and displaying the data of the selected one time point in gray scale.

8. The extraction method of claim 1, wherein:
the requirement information is the extraction of time-spectrum data of a preset spectral band at a preset spatial location, the data format matching with the requirement information is a fourth data format, the storage method corresponding to the fourth data format comprises:
dividing the four-dimensional remote sensing data into a plurality of time cubes according to the spectral band, and each time cube is space-time data corresponding to the spectral band; and
storing each time cube into the storage unit according to the spectral band in an order from high to low or from low to high, wherein when each time cube is stored, the space-time data in the time cube is stored in time order, and the space-time data at a same time point is stored according to spatial location in an order that row is first and then column.

9. The extraction method of claim 1, wherein:
the requirement information is the extraction of time-spectrum data at a preset spatial location, the data format matching with the requirement information is a fifth data format, the storage method corresponding to the fifth data format comprises:
storing the four-dimensional remote sensing data into the storage unit according to the spectral band in an order from high to low or from low to high, and the four-dimensional remote sensing data of a same spectral band is stored in time order, and the remote sensing data at a same time point is stored according to spatial location in an order that row is first and then column.

10. An extraction method for time-space-spectrum four-dimensional remote sensing data, comprises:
obtaining remote sensing images at a preset coverage area during a preset time period;
re-projecting the remote sensing images in a way that respective pixel positions of the respective remote sensing images at different time points are overlapped; wherein the re-projected remote sensing images are a number of spectral cubes in time sequence, and each spectral cube is space-spectrum data of corresponding time point;
storing the re-projected remote sensing images into a storage unit according to a first preset storage method, so as to obtain a remote sensing data in a first data format; or storing the re-projected remote sensing images into the storage unit according to a second preset storage method, so as to obtain the remote sensing data in a second data format; and determining, on a basis of requirement information for data extraction, whether current data format of the remote sensing data is a data format matching the requirement information,
when the current data format of the remote sensing data is the data format matching with the requirement information, determining, on the basis of the requirement information, a storage location of required remote sensing data, and extracting the required remote sensing data;
wherein, the first preset storage method includes:
storing each spectral cube into the storage unit in time order, wherein when each spectral cube is stored, the space-spectrum data in the spectral cube is stored according to spatial location in an order that row is first and then column, and the space-spectrum data in a same spatial location is stored according to spectral band in an order from high to low or from low to high;
wherein, the second preset storage method includes:
storing each spectral cube into the storage unit in time order, wherein when each spectral cube is stored, the space-spectrum data in the spectral cube is stored according to the spectral band in an order from high to low or from low to high, and the space-spectrum data of a same spectral band is stored according to the spatial location in an order that row is first and then column;
the requirement information is the extraction of the spectral cube of a preset time point, the data format matching with the requirement information is the first data format; or
the requirement information is the extraction of the spectral data at a present spatial location and at the preset time point, the data format matching with the requirement information is the second data format;
wherein the requirement information is the extraction of the spectral cube of the preset time point, the extraction method further comprises:
selecting data of three spectral bands from the spectral cube at the preset time point, and synthesizing and displaying the data of the selected three spectral bands as three channels of RGB; or
selecting data of one spectral band from the spectral cube at the preset time point, and displaying the data of the selected spectral band in gray scale.

11. An extraction method for time-space-spectrum four-dimensional remote sensing data, comprises:
obtaining remote sensing images at a preset coverage area during a preset time period;
re-projecting the remote sensing images in a way that respective pixel positions of the respective remote sensing images at different time points are overlapped; wherein the re-projected remote sensing images are a number of spectral cubes in time sequence, and each spectral cube is space-spectrum data of corresponding time point;
storing the re-projected remote sensing images into a storage unit according to a first preset storage method, so as to obtain a remote sensing data in a first data format; or storing the re-projected remote sensing images into the storage unit according to a second preset storage method, so as to obtain the remote sensing data in a second data format; and
determining, on a basis of requirement information for data extraction, whether current data format of the remote sensing data is a data format matching the requirement information,
when the current data format of the remote sensing data is the data format matching with the requirement information, determining, on the basis of the requirement information, a storage location of required remote sensing data, and extracting the required remote sensing data;
wherein, the first preset storage method includes:
storing each spectral cube into the storage unit in time order, wherein when each spectral cube is stored, the space-spectrum data in the spectral cube is stored according to spatial location in an order that row is first and then column, and the space-spectrum data in a same spatial location is stored according to spectral band in an order from high to low or from low to high;
wherein, the second preset storage method includes:
storing each spectral cube into the storage unit in time order, wherein when each spectral cube is stored, the space-spectrum data in the spectral cube is stored according to the spectral band in an order from high to low or from low to high, and the space-spectrum data of a same spectral band is stored according to the spatial location in an order that row is first and then column;
wherein the requirement information is the exportation of a feature cube, the data format matching with the requirement information is the first data format; the feature cube comprises data of at least three preset spectral bands selected from the spectral cube at the preset time point, or data of at least three preset time points selected from the time cube of preset spectral band;
wherein the extraction method further comprises:
selecting data of three spectral bands from the feature cube that comprises data of at least three preset spectral bands or selecting data of three time points from the feature cube that comprises data of at least three preset time points, as three channels of RGB to be synthesized and displayed; or
selecting data of one spectral band from the feature cube that comprises data of at least three preset spectral bands or selecting data of one time point from the feature cube that comprises data of at least three preset time points, to be displayed in a gray scale map.

* * * * *